June 30, 1931.  H. B. ELY  1,811,997
METHOD AND MEANS FOR TRAINING OPERATORS OF SOUND LOCATING DEVICES
Filed Dec. 4, 1928  2 Sheets-Sheet 1

Inventor
Hiram B. Ely
By W. N. Roach
Attorney

June 30, 1931. H. B. ELY 1,811,997
METHOD AND MEANS FOR TRAINING OPERATORS OF SOUND LOCATING DEVICES
Filed Dec. 4, 1928 2 Sheets-Sheet 2
Fig-3-
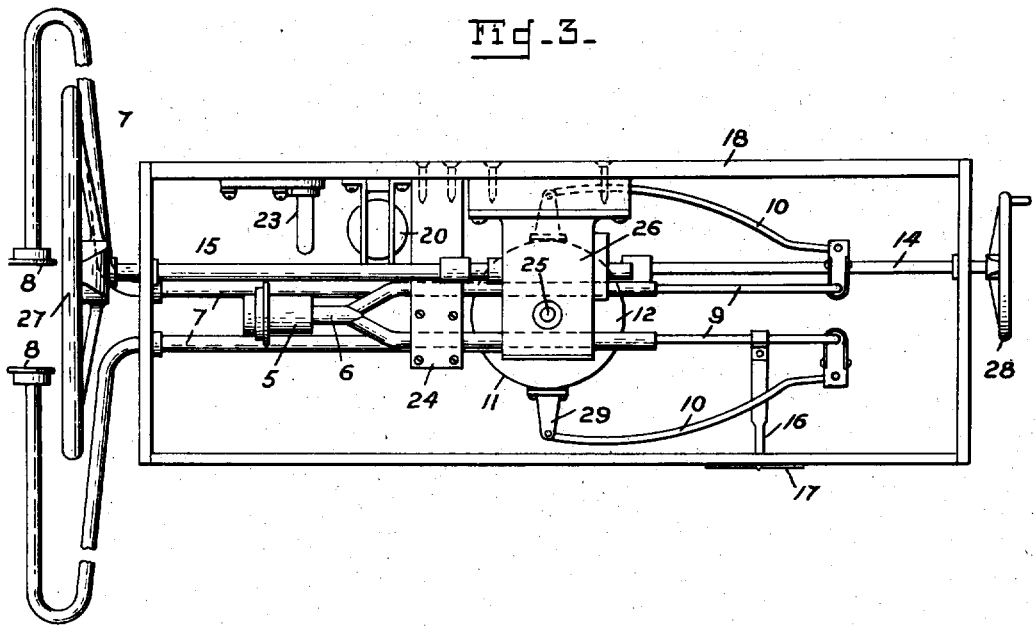
Fig-4-
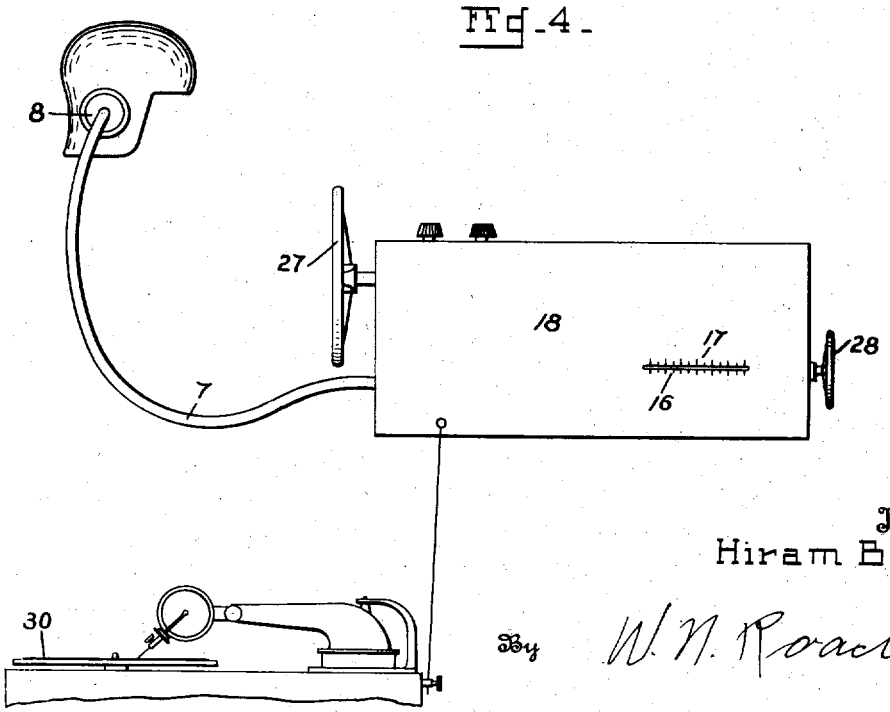
Inventor
Hiram B. Ely
By W. N. Roach.
Attorney Patented June 30, 1931

1,811,997

UNITED STATES PATENT OFFICE

HIRAM B. ELY, OF PHILADELPHIA, PENNSYLVANIA

METHOD AND MEANS FOR TRAINING OPERATORS OF SOUND LOCATING DEVICES

Application filed December 4, 1928. Serial No. 323,741.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to a method of and means for training operators of sound locating devices which are of the type functioning according to the system of binaural comparison.

The purpose of the invention is to provide a self-contained unit, including a source of sound, means under the control of an instructor for varying the length of travel of the sound to the ears of the listener to establish a phase difference and means, including an indicating device, under the control of the listener for counter-acting the displacement imparted by the instructor to equalize the length of travel of the sound.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 3 is a plan view thereof;

Fig. 4 is a view in side elevation of the assembled unit with an external source of sound.

Figure 1:
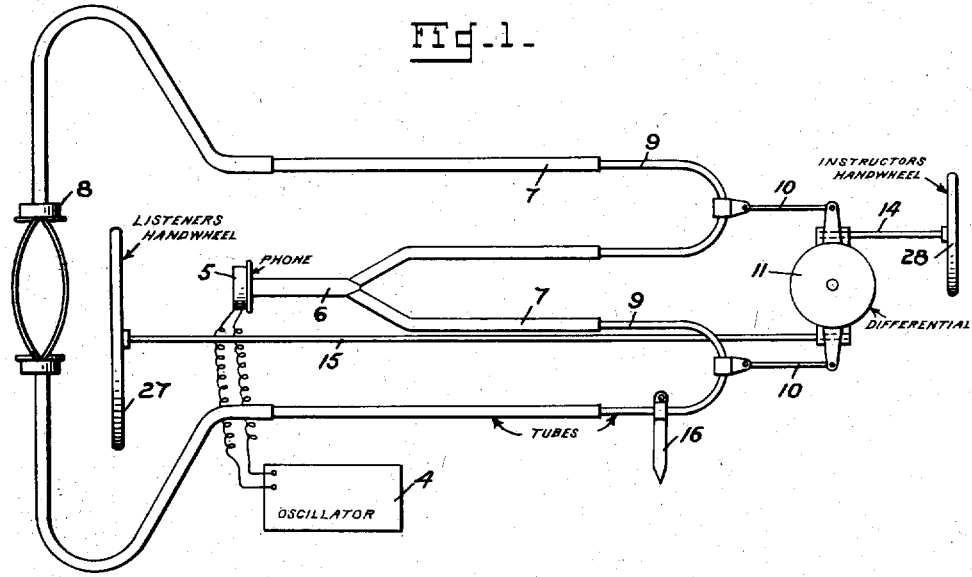
Fig. 1 is a schematic view illustrating the principle of the invention.

Referring to the drawings by numerals of reference:

In Fig. 1 a sound wave emanating from a sound producing device 4 of any suitable character is conducted through a receiver 5 to a tube 6 which is divided to form paths of communication 7—7 leading to ear pieces 8—8. Each of the paths of communication includes an adjustable element 9 whereby the length of the paths may be varied. The adjustable elements are connected by means of rods 10 to opposite sides of the annulus 11 of a differential gear mechanism 12 so that displacement of one of the adjustable elements will oppositely affect the other. One of the axles of the differential is geared to a shaft 14 which is under the control of the instructor and the other is geared to a shaft 15 which is under the control of the listener who is to undergo training.

The instructor by varying the distance of sound transmission from the receiver to the ear of the listener creates an impression of lateral direction which the listener can convert into a central or balanced direction by imparting to the differential a displacement complementary to that imparted by the instructor, thereby equalizing the distance and the time of travel of the sound to his ears.

When the paths of communication 7 are balanced, a pointer 16 on one of the adjustable elements 9 will register with the zero of a scale 17. Failure on the part of the listener to correctly balance the paths 7 will be indicated on the scale and such indications will serve as a measure to determine the fitness and aptitude of the listener or to determine the percentage error which must be applied to the readings when he is operating a sound locating device. If the instructor and the listener act on the differential in unison, the annulus 11 and the adjustable elements 9 will remain stationary.

Figure 2:
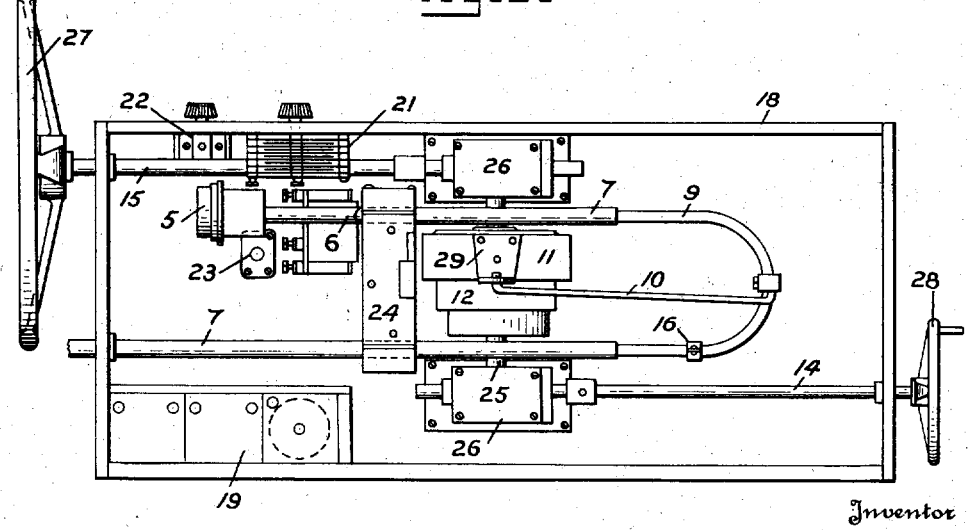
Fig. 2 is a view in side elevation of an apparatus constructed in accordance with the invention.

Referring to Figs. 2 and 3 which illustrate an actual embodiment of the invention, there is provided a container 18 in which is mounted the sound-producing unit 4 in the form of a standard vacuum tube oscillator comprising batteries 19, transformer 20, condenser 21, rheostat 22 and vacuum tube 23 all wired in the customary manner. The paths of communications 7 are in the form of U shaped tubes carried by a block 24 and have slidable bent portions which constitute the adjustable elements 9. The tubes 7 are branched from the tube 6 which carries the receiver 5. The differential gear 12 is positioned adjacent the block 24 and is mounted through its axles 25 by gear speed reduction units 26, the upper one of which is actuated through the shaft 15 and the lower one actuated through the shaft 14. These shafts extend through opposite ends of the container and their extremities carry hand wheels 27 and 28, the hand wheel 27 of the shaft 15 being preferably of the same size as the hand wheel on the sound locating instrument for which the listener is to be trained. The annulus 11 of the differential gear mechanism is equipped with brackets 29 for attachment of the rods 10.

In Fig. 4 there is indicated a sound source consisting of a phonograph record 30 which, in order to add realism to the training, reproduces the sound of an aeroplane in flight.

I claim:

1. The method of training in binaural comparison which consists in establishing a source of sound from a fixed position transmitting the sound through a single receiver and thence by separate paths to each ear of a listener, arbitrarily varying said paths to create an impression of lateral direction, having the listener equalize the paths to perceive an impression of central direction and measuring any failure to equalize the paths.

2. The method of training in binaural comparison which consists in establishing a source of sound, transmitting the sound through a single receiver and thence by separate paths to each ear of a listener, arbitrarily varying said paths to create an impression of lateral direction, having the listener equalize the paths to perceive an impression of central direction and measuring any failure to equalize the paths.

3. The method of training in binaural comparison which consists in establishing a source of sound, transmitting the sound through a single receiver and thence by separate paths to each ear of a listener, arbitrarily varying said paths to create an impression of lateral direction and having the listener equalize the paths to perceive an impression of central direction.

4. Means for training a listener in binaural comparison, including a container, a source of sound in the container, a single sound receiver, separate adjustable means for conducting the sound from the receiver to each ear of the listener, a differential gear connected with the adjustable conducting means, a dual control for the differential gear and means for indicating the relative positions of the conducting means.

5. Means for training a listener in binaural comparison, including a single sound receiver, separate adjustable means for conducting the sound from the receiver to each ear of the listener, a differential gear connected with the adjustable conducting means, a dual control for the differential gear and means for indicating the relative positions of the conducting means.

6. Means for training a listener in binaural comparison, including a single sound receiver, separate adjustable means for conducting the sound from the receiver to each ear of the listener, a differential gear connected with the adjustable conducting means and a dual control for the differential gear.

7. Means for training a listener in binaural comparison including a fixed sound receiver, separate adjustable means for conducting sound from the receiver to each ear of the listener and a dual control operating mechanism for adjusting the sound conducting means.

8. Means for training a listener in binaural comparison including separate adjustable means for conducting sound to each ear of the listener and a dual control operating mechanism for adjusting the sound conducting means.

9. Means for training in binaural comparison comprising a sound source, two paths of sound transmission, means for supplying a movement which will vary the length of the paths of transmission and an additional means for supplying a movement which will vary the length of the paths of transmission whereby the first movement may be counteracted.

10. A method of binaural comparison embodying, establishing a unitary source of sound wave propagation, conducting said waves by separate paths, and varying the length of the paths at will to change the sense of direction of said source of sound wave propagation.

HIRAM B. ELY.